(No Model.)

A. A. SANBORN.
Elastic Die for Pressing Celluloid Collars, Cuffs, and other Articles.

No. 233,878.          Patented Nov. 2, 1880.

Witness
N C Bristol
R S Steadman

Inventor
Albert A. Sanborn
By Horace Harris Atty

United States Patent Office.

ALBERT A. SANBORN, OF NEWARK, NEW JERSEY, ASSIGNOR TO HIMSELF AND CELLULOID NOVELTY COMPANY.

ELASTIC DIES FOR PRESSING CELLULOID COLLARS, CUFFS, AND OTHER ARTICLES.

SPECIFICATION forming part of Letters Patent No. 233,878, dated November 2, 1880.

Application filed April 13, 1880. (No model.)

*To all whom it may concern:*

Be it known that I, ALBERT A. SANBORN, of Newark, in the county of Essex and State of New Jersey, have invented a new and useful Improvement in Elastic Dies for Pressing Celluloid Collars, Cuffs, and other Articles, of which the following is a specification.

My invention relates to the manufacture of celluloid collars and cuffs, and to other articles made or covered with celluloid or other plastic material where there is an uneven surface, where the hem, &c., is designed to be shown in imitation of linen goods, and in other articles where figures are desired to be shown, or an overlay of celluloid or other plastic material; and my invention consists in the dies I employ in pressing the goods after they have been molded or made with an overlay and before the plastic material has hardened.

Figure 1:
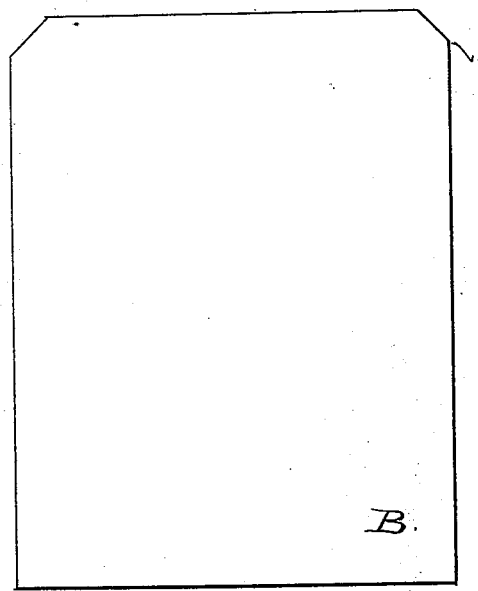
Figure 2:
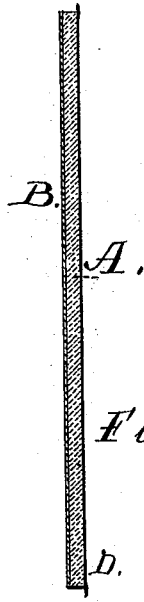
Figure 3:
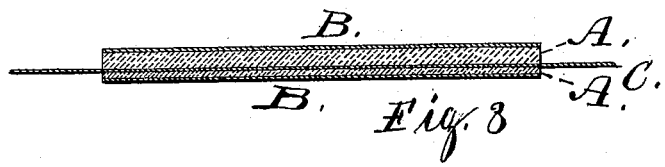

Figure 1 is a plan. Fig. 2 is a cross-section. Fig. 3 is a modified form in cross-section.

For my dies I take a sheet of elastic rubber, A, of suitable thickness—perhaps usually about one-eighth of an inch thick—and lay it on the goods to be pressed. On this rubber I place a sheet of tin, B, or other metal, to receive the portion of the press coming in contact with the die, and to distribute the pressure on the surface of the article being pressed or molded.

On the surface of the rubber coming next the goods I may paste a layer of cloth, D, to prevent the rubber from soiling the goods. A piece may also be pasted on the side next to the plate, to prevent them—the rubber and plate—from sticking together. This rubber, under the press, forces the celluloid down into all recesses and fissures in the article being covered, the rubber being applied to the side of the article having an uneven profile or irregular surface, as in pressing collars and cuffs the rubber is applied to the surface where the form of hem and stitching are desired to be shown.

In some cases both surfaces of the article being made have depressions or elevations which need to be brought out, in which case the die will be duplicated, and a similar sheet of rubber and metal plate will be placed on the lower side of the article on the bed of the press, leaving the article C between two elastic dies, as seen in Fig. 3, the principle in both cases being the same. In this way the figure or forms of any article being covered with celluloid will be made to stand out and be finished in relief.

I claim—

The elastic-rubber die A, with or without the lining D, in combination with the metal plate B, substantially as and for the purpose specified.

ALBERT A. SANBORN.

Witnesses:
 HORACE HARRIS,
 N. C. BRISTOL.